(12) United States Patent
Saito et al.

(10) Patent No.: US 10,575,509 B2
(45) Date of Patent: Mar. 3, 2020

(54) DRAG KNOB

(71) Applicant: Shimano Inc., Sakai, Osaka (JP)

(72) Inventors: Kei Saito, Osaka (JP); Takuji Takamatsu, Osaka (JP); Takanori Maruoka, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/217,457

(22) Filed: Dec. 12, 2018

(65) Prior Publication Data
US 2019/0230908 A1 Aug. 1, 2019

(30) Foreign Application Priority Data

Jan. 31, 2018 (JP) .................................. 2018-014219

(51) Int. Cl.
*A01K 89/01* (2006.01)
*A01K 89/027* (2006.01)

(52) U.S. Cl.
CPC ...... *A01K 89/028* (2015.05); *A01K 89/01121* (2015.05); *A01K 89/03* (2015.05)

(58) Field of Classification Search
CPC .. A01K 89/0111; A01K 89/028; A01K 89/03; A01K 89/029
See application file for complete search history.

(56) References Cited

U.S. PATENT DOCUMENTS

| | | | | |
|---|---|---|---|---|
| 2002/0088889 A1* | 7/2002 | Morise | ............... | A01K 89/0111 242/322 |
| 2003/0001035 A1* | 1/2003 | Hitomi | ............... | A01K 89/0111 242/322 |
| 2009/0272831 A1* | 11/2009 | Matsuo | ............... | A01K 89/0111 242/322 |
| 2015/0216156 A1* | 8/2015 | Miyamoto | ......... | A01K 89/0111 242/245 |

FOREIGN PATENT DOCUMENTS

JP 2006-136216 A 6/2006

* cited by examiner

*Primary Examiner* — Emmanuel M Marcelo
(74) *Attorney, Agent, or Firm* — Global IP Counselors, LLP (57) ABSTRACT

A drag knob for adjusting a drag force of a spinning reel includes a knob body, a screwable member and a rotation prevention member. The knob body includes a knob portion rotatable in a circumferential direction of the spool shaft, and an accommodating recess. The knob body protrudes forward in an axial direction and extends in a radial direction. The accommodating recess has a rearward opening in the axial direction of the spool shaft. The screwable member is disposed in the accommodating recess of the knob body and is screwed onto a front end of the spool shaft. The rotation prevention member is configured to prevent the screwable member from rotating relative to the knob body, has a width narrower than a width of the knob portion and protrudes from the screwable member in a same direction as an extending direction of the knob portion of the knob body.

5 Claims, 6 Drawing Sheets

DRAG KNOB

CROSS-REFERENCE TO RELATED APPLICATIONS

This application claims priority to Japanese Patent Application No. 2018-014219, filed on Jan. 31, 2018. The entire disclosure of Japanese Patent Application No. 2018-014219 is hereby incorporated herein by reference.

BACKGROUND

Field of the Invention

The present invention relates to a drag knob; more specifically, the present invention relates to a drag knob that is screwed onto the front end of a spool shaft of a spinning reel and that is used to adjust the drag force of a drag mechanism.

Background Art

In general, spinning reels include a drag mechanism for braking the rotation of the spool. The adjustment of the drag force of the drag mechanism is carried out by rotating a drag knob that is screwed onto the front end of the spool shaft. The drag knob comprises a knob body and a nut member. The knob body includes a knob portion for rotating the knob body and an accommodating recess for accommodating the nut member. The nut member can be a hexagonal nut, for example, and is disposed in the accommodating recess of the knob body so as to be non-rotatable with respect to the knob body (refer to Japanese Published Unexamined Application No. 2006-136216).

In the drag knob of Japanese Published Unexamined Application No. 2006-136216, since the nut member is prevented from rotating by an accommodating recess whose bottom portion is formed in a hexagonal shape, the outer diameter of the accommodating recess is enlarged. If the outer diameter of the accommodating recess is enlarged, a portion of the accommodating recess protrudes in the widthwise direction of the knob portion of the knob body, that is, protrudes from the width of the knob portion, which increases the width of the knob portion, making the grasping of the knob portion difficult. More specifically, when a hexagonal nut is used to prevent the rotation at the outer peripheral portion of the hexagonal nut, the protrusion in the width direction becomes pronounced, and there is the risk of deterioration of the operability during rotation of the knob body.

SUMMARY

The object of the present invention is to improve the operability of the drag knob.

According to one aspect of the present invention, a drag knob is screwed onto the front end of a spool shaft and adjusts the drag force of a drag mechanism of a spinning reel. The drag knob comprises a knob body, a screwable member, and a rotation prevention member. The knob body includes a knob portion rotatable in a circumferential direction of the spool shaft, and an accommodating recess. The knob body protrudes forward in an axial direction of the spool shaft and extends in a radial direction of the spool shaft. The accommodating recess has a rearward opening in the axial direction of the spool shaft. The screwable member is disposed in the accommodating recess of the knob body and is screwed onto the front end of the spool shaft. The rotation prevention member is configured to prevent the screwable member from rotating relative to the knob body, has a width narrower than a width of the knob portion and protrudes from the screwable member in a same direction as an extending direction of the knob portion of the knob body.

With respect to the drag knob, the rotation prevention member has a narrower width than the width of the knob portion and protrudes from the screwable member only in the direction in which the knob portion of the knob body extends. As a result, the dimension of the screwable member is reduced in the width direction (the same direction as the width direction of the knob portion), and it is thereby possible to prevent an increased width of the knob portion due to the protrusion caused by the accommodating recess extending outwardly in the knob body. Thus, grasping of the knob portion is facilitated, which improves operability during the rotation of the knob body. In addition, because the rotation prevention member is disposed to be farther outside of the screwable member in the radial direction, it is possible to effectively prevent the rotation of the screwable member relative to the knob body.

Preferably, the rotation prevention member comprises a shaft member penetrating the screwable member in the radial direction of the spool shaft. In this embodiment, because the screwable member and the rotation prevention member can be formed from separate members, the external dimensions of the screwable member can be reduced, and it is possible to reduce the size of the accommodating recess that houses or accommodates the screwable member. Thus, it is possible to further prevent an increase in the width of the knob portion due to the accommodating recess extending outwardly in the knob body, and grasping of the knob portion can be facilitated.

Preferably, the outer circumferential surface of the screwable member is cylindrical. In this embodiment, it is possible to reduce the outer diameter of the screwable member, which improves the operability during rotation of the knob body, in the same manner as described above.

Preferably, the knob body has an engagement recess engaging the rotation prevention member. In this embodiment, because the rotation prevention member is narrower in width than the knob portion, it is possible to reduce the widthwise dimension of the engagement recess. It is thereby possible to prevent an increase in the width of the knob portion due to the engagement recess extending outwardly in the knob body, which improves the operability during rotation of the knob body, in the same manner as described above.

Preferably, the rotation prevention member is integral with the screwable member. In this embodiment, for example, it is possible to effectively prevent the rotation of the screwable member relative to the knob body by using a rectangular screwable member that is long in the direction in which the knob portion extends when viewed in the axial direction. Additionally, since the widthwise dimension of the screwable member can be reduced, it is possible to prevent an increase in the width of the knob portion due to the engagement recess extending outwardly in the knob body, which improves operability during rotation of the knob body, in the same manner as described above.

According to the present invention, it is possible to improve the operability of the drag knob in the drag knob.

DETAILED DESCRIPTION OF THE EMBODIMENT

Figure 1:
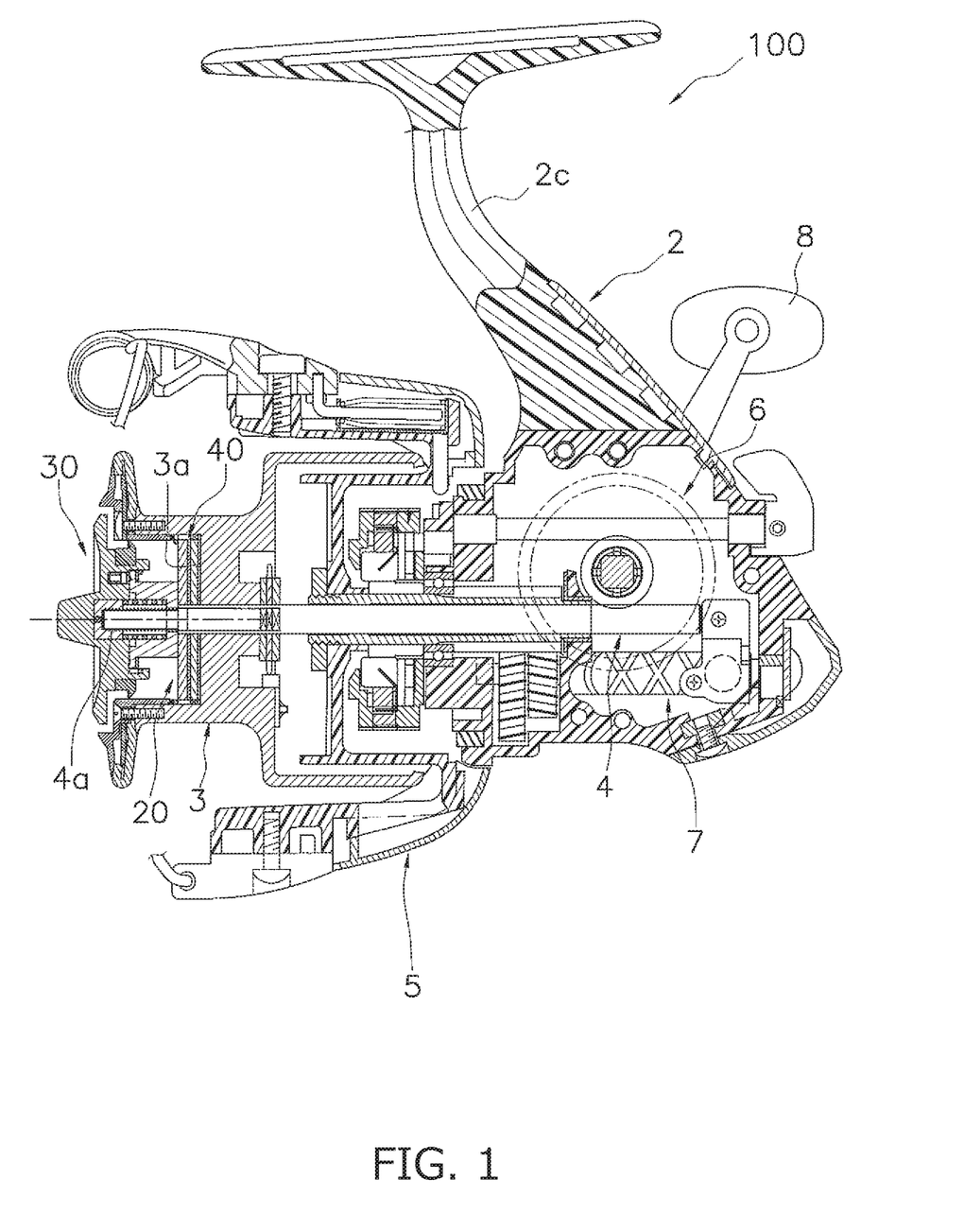
FIG. 1 is a longitudinal cross-sectional view of a spinning reel employing one embodiment of the present invention.

FIG. 1 is a longitudinal cross-sectional view of a spinning reel 100 employing one embodiment of the present invention. The spinning reel 100 comprises a reel body 2, a spool 3, a spool shaft 4, a rotor 5, and a drag mechanism 20. In the following description, the direction in which a fishing line is cast (unreeled) is referred to as the "front" (left side in FIG. 1), and the opposite direction is referred to as the "rear." In addition, the direction in which the spool shaft 4 extends is referred to as the "axial direction," the direction orthogonal to the spool shaft 4 is referred to as the "radial direction," and the direction around the axis of the spool shaft 4 is referred to as the "circumferential direction."

As shown in FIG. 1, the reel body 2 defines an internal space, and the internal space houses, for example, a rotor drive mechanism 6 for driving the rotor 5, an oscillating mechanism 7 for uniformly winding of a fishing line about the spool 3, and the like. A handle 8 is rotatably mounted on the reel body 2. Since the rotor drive mechanism 6 and the oscillating mechanism 7 are conventionally configured, detailed descriptions thereof have been omitted.

The spool 3 has an outer periphery around which the fishing line is wound. The spool 3 is rotatably supported by the spool shaft 4. The spool 3 has a recess 3a, the front portion of which is open. A portion of the drag mechanism 20 is accommodated or disposed in the recess 3a.

The spool shaft 4 extends through the central portion of the spool 3 in the axial direction. The spool shaft 4 is non-rotatably supported by the reel body 2. When the handle 8 is rotated, the spool shaft 4 moves with the spool 3 in the longitudinal direction in a reciprocating manner with respect to the reel body 2 via the oscillating mechanism 7. The spool shaft 4 has a male-threaded portion 4a at the front end.

The rotor 5 winds the fishing line around the spool 3. The rotor 5 rotates about the spool shaft 4 with the rotation of the handle 8 by the rotor drive mechanism 6.

The drag mechanism 20 brakes the rotation of the spool 3. The drag mechanism 20 comprises a drag knob 30 and a plurality of friction members 40.

Figure 2:
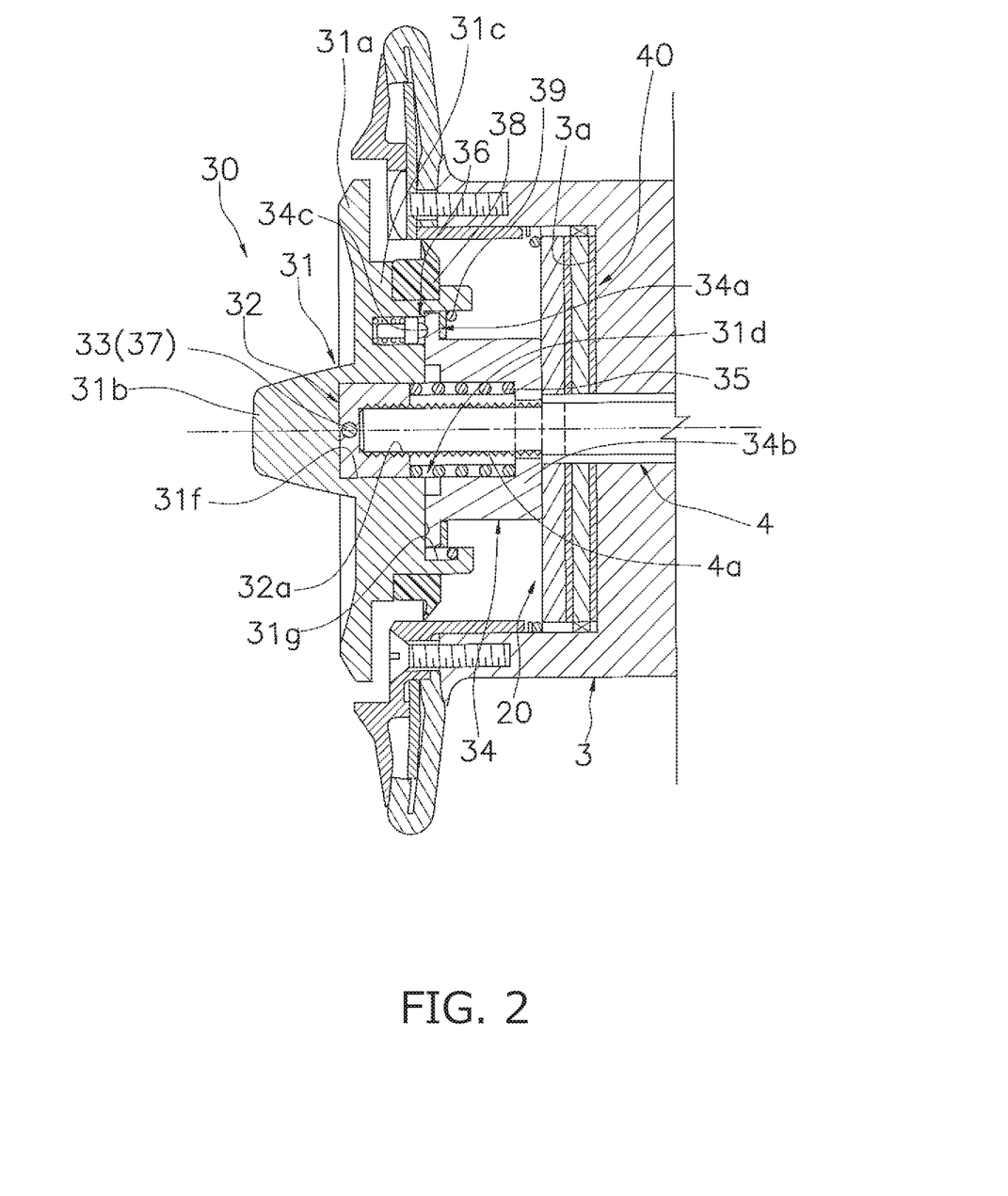
FIG. 2 is an enlarged view of a drag knob in FIG. 1.

The drag knob 30 is an operating member for adjustment of the drag force of the drag mechanism 20 of the spinning reel 100. The drag knob 30 is screwed to the front end of the spool shaft 4 and can move in the axial direction with respect to the spool shaft 4. As shown in the enlargement of FIG. 2, the drag knob 30 comprises a knob body 31, a screwable member 32, a rotation prevention member (a rotation preventer) 33, a pressing member 34, a biasing member 35, and a sound-generating mechanism (sound generator) 36.

Figure 3:
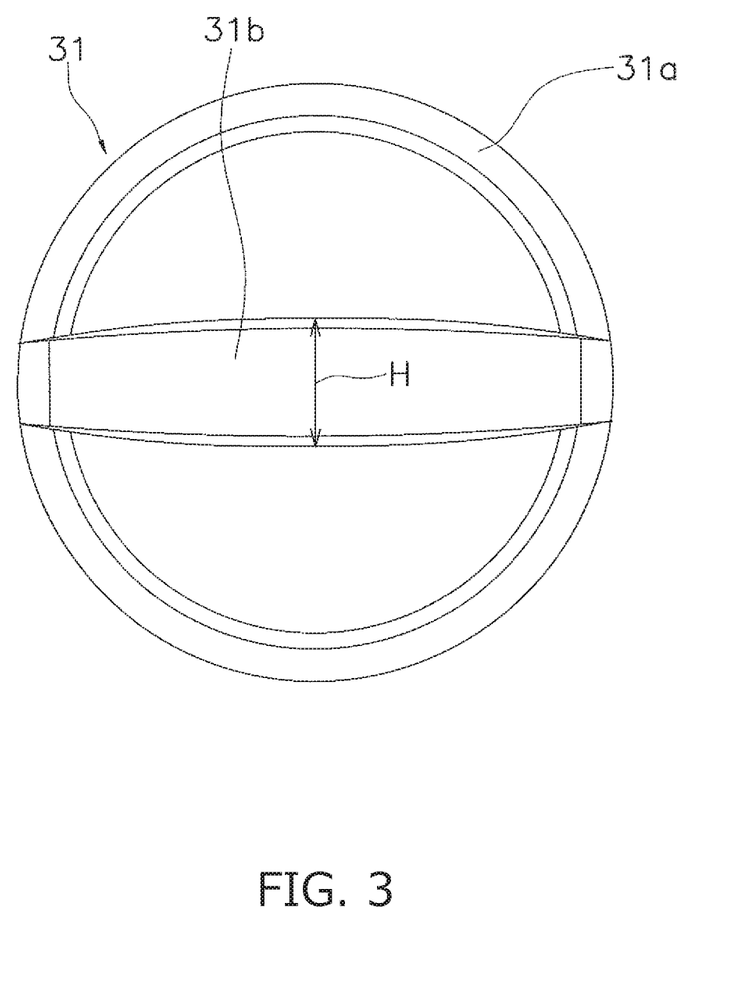
FIG. 3 is a front view of a knob body.
Figure 4:
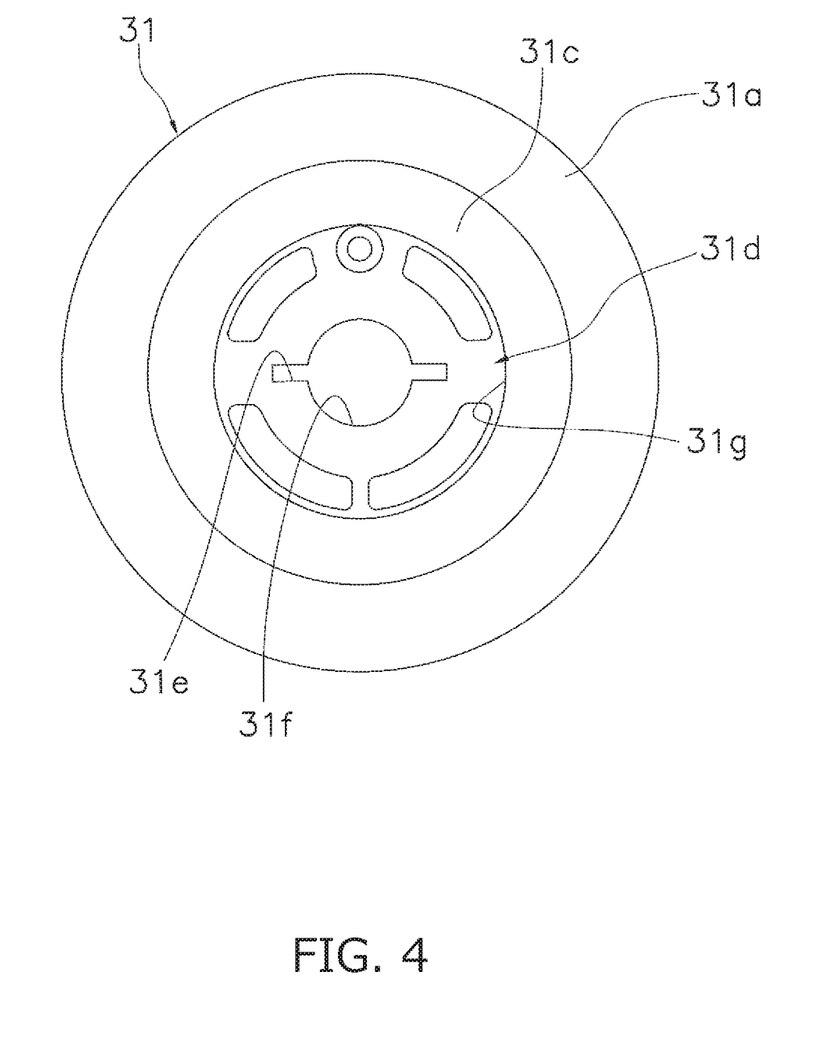
FIG. 4 is a rear view of the knob body.

The knob body 31 can be rotated in the circumferential direction of the spool shaft 4. As shown in FIGS. 2 to 4, the knob body 31 includes a cover portion 31a, a knob portion 31b, a cylindrical portion 31c, an accommodating recess 31d, and an engagement recess 31e.

The cover portion 31a is circular in shape with an outer diameter that is larger than the inner diameter of the recess 3a of the spool 3, and is disposed so as to cover the recess 3a from the front.

The knob portion 31b is used for the manual grasping and the rotation of the knob body 31. The knob portion 31b is disposed in the front portion of the knob body 31. Specifically, the knob portion 31b is formed so as to project axially forward from the cover portion 31a and extend radially. The knob portion 31b is formed to extend radially from one end of the cover portion 31a to the other, along the diameter of the cover portion 31a. The knob portion 31b is disposed in a position in which the central portion overlaps the spool shaft 4 in the axial direction.

The cylindrical portion 31c extends axially rearward from the rear portion of the cover portion 31a. A seal member 38 that seals a gap between the drag knob 30 and the recess 3a of the spool 3 is attached to the outer circumferential surface of the cylindrical portion 31c.

The accommodating recess 31d is disposed in the knob body 31, and the rear portion thereof is open. The screwable member 32 and a portion of the biasing member 35 are disposed in the accommodating recess 31d. The accommodating recess 31d has a small diameter portion 31f and a large diameter portion 31g, which is larger in diameter than the small diameter portion 31f. The small diameter portion 31f and the large diameter portion 31g are circular holes that are recessed in the axial direction. The small diameter portion 31f houses the screwable member 32. Specifically, the small diameter portion 31f is formed in a position that overlaps the knob portion 31b, the cover portion 31a, and the cylindrical portion 31c in the radial direction.

As shown in FIG. 4, the engagement recess 31e is a groove that is recessed in the axial direction as well as in the direction in which the knob portion 31b of the knob body 31 extends, and an internal space is formed so as to be continuous with the small diameter portion 31f and the large diameter portion 31g. The engagement recess 31e is formed linearly recessed from the inner peripheral portion of the small diameter portion 31f toward the outside in the radial direction, so as to traverse the inner peripheral portion of the small diameter portion 31f in the radial direction.

Figure 5:
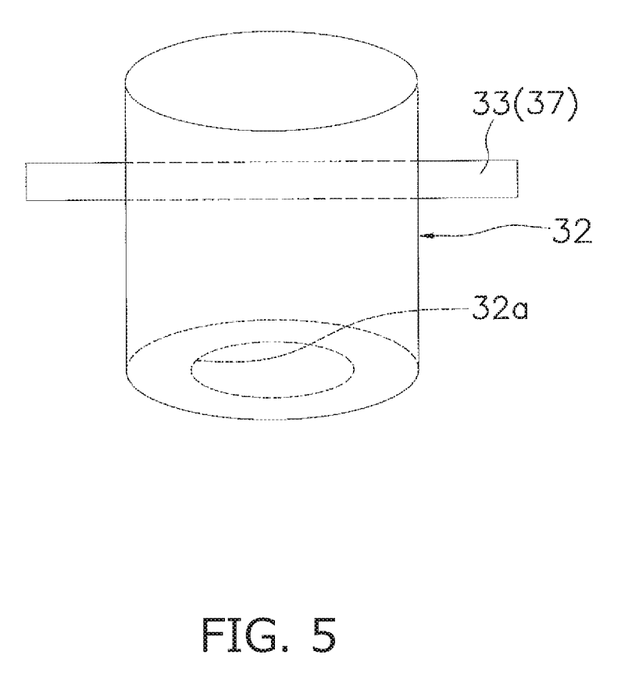
FIG. 5 is a perspective view of a screwable member.

The screwable member 32 is disposed in the accommodating recess 31d. More specifically, as shown in FIGS. 2 and 5, the screwable member 32 has a bottomed tubular shape and is housed in the small diameter portion 31f of the accommodating recess 31d. The outer peripheral surface of the screwable member 32 is cylindrical. The screwable member 32 has a female-threaded portion 32a that is screwed onto the male-threaded portion 4a of the spool shaft 4 on the inner peripheral portion thereof.

The rotation prevention member 33 prevents the screwable member 32 from rotating relative to the knob body 31. The width of the rotation prevention member 33 is narrower than the width H of the knob portion 31b of the knob body 31 (refer to FIGS. 2 and 3). Here, the width H is the length in a direction that intersects the direction in which the knob portion 31b extends. As shown in FIG. 5, in the present embodiment, the rotation prevention member 33 is formed from a shaft member 37 that radially penetrates the screwable member 32. Both ends of the shaft member 37 radially project from the screwable member 32 to the outside. Specifically, both ends of the shaft member 37 project from the outer periphery of the screwable member 32 only in the direction in which the knob portion 31b of the knob body 31 extends. Both ends of the shaft member 37 are disposed in the engagement recess 31e of the knob body 31. That is, both ends of the shaft member 37 engage with the engagement recess 31e to thereby prevent the screwable member 32 from rotating relative to the knob body 31. As a result, when the knob body 31 is circumferentially rotated, the screwable member 32 rotates integrally with the knob body 31 and the knob body 31 moves axially with respect to the spool shaft 4.

As shown in FIG. 2, the pressing member 34 is attached to the spool shaft 4 so as to be non-rotatable with respect to the spool shaft 4 and to be movable in the axial direction. The pressing member 34 is axially disposed between the knob body 31 and the plurality of friction members 40. The front portion of the pressing member 34 is in contact with the large diameter portion 31g of the accommodating recess 31d, and the rear portion is disposed to be in contact with the plurality of friction members 40. The pressing member 34 is retained with respect to the knob body 31 by a retaining member 39 that is disposed in the inner peripheral portion of the large diameter portion 31g of the accommodating recess 31d.

The pressing member 34 includes a flange portion 34a and a cylindrical portion 34b that extends axially rearward from the flange portion 34a. The flange portion 34a is disposed in the large diameter portion 31g of the accommodating recess 31d. The flange portion 34a has a plurality of sound-emitting recesses 34c that are provided at intervals in the circumferential direction on the front surface thereof.

The biasing member 35 can be a coil spring, for example, for biasing the knob body 31 and the pressing member 34 in directions axially away from each other. One end of the biasing member 35 is in contact with the screwable member 32, and the other end is disposed to be in contact with the pressing member 34. More specifically, the biasing member 35 is disposed around the axis of the spool shaft 4 and is disposed in the inner peripheral portion of the small diameter portion 31f of the accommodating recess 31d and the inner peripheral portion of the cylindrical portion 34b of the pressing member 34 in a compressed state. The biasing force of the biasing member 35 changes in accordance with the axial position of the screwable member 32.

The sound-generating mechanism 36 is disposed in the knob body 31 and generates sound in accordance with the rotation of the knob body 31. Since the sound-generating mechanism 36 is conventionally configured, a detailed description thereof has been omitted.

The plurality of friction members 40 are disposed in the recess 3a of the spool 3. The friction members 40 are composed of a plurality of metal plates that are non-rotatably attached to the spool shaft 4. The front surfaces of the friction members 40 are pressed by the pressing member 34 that is biased by the biasing member 35.

When the drag knob 30 is rotated, the biasing force of the biasing member 35 changes in accordance with the axial movement of the screwable member 32, and the pressing force of the pressing member 34, which presses the friction members 40, changes. The drag force of the drag mechanism 20 is thereby adjusted.

In the drag knob 30, configured as described above, the screwable member 32 and the rotation prevention member 33 are formed as separate members, and the rotation prevention member 33, which has a narrower width than the width H of the knob portion 31b, projects from the outer periphery of the screwable member 32 only in the direction in which the knob portion 31b extends. As a result, for example, compared to a design in which the screwable member 32 has a hexagonal shape, it is possible to reduce the widthwise dimensions of the rotation prevention member 33 and the screwable member 32 (i.e., in the same widthwise direction as that of the knob portion 31b). That is, it is possible to prevent an increase in the width H of the knob portion 31b due to the extension of the engagement recess 31e and the accommodating recess 31d outwardly on the knob body 31. As a result, grasping of the knob portion 31b is facilitated, which improves the operability during rotation of the knob body 31. In addition, because the rotation prevention member 33 is disposed farther outside of the screwable member 32 in the radial direction, it is possible to effectively prevent the rotation of the screwable member 32 relative to the knob body 31.

Other Embodiments

One embodiment of the present invention was described above, but the present invention is not limited to the above-described embodiment, and various modifications can be made without departing from the scope of the invention.

In the embodiment described above, the shaft member 37, which radially penetrates the screwable member 32, constituted the rotation prevention member 33; however, the configuration of the rotation prevention member 33 is not limited to the above-described embodiment. For example, a projection that projects radially outwardly from the outer periphery of the screwable member 32 may be integrally formed with the screwable member 32, and the rotation of the screwable member 32 may be prevented by this projection. In this embodiment, since the rotation prevention member 33 does not penetrate the screwable member 32, it is possible to form the spool shaft 4 so as to penetrate the screwable member 32 and to increase the axially movable range of the screwable member 32.

Figure 6:
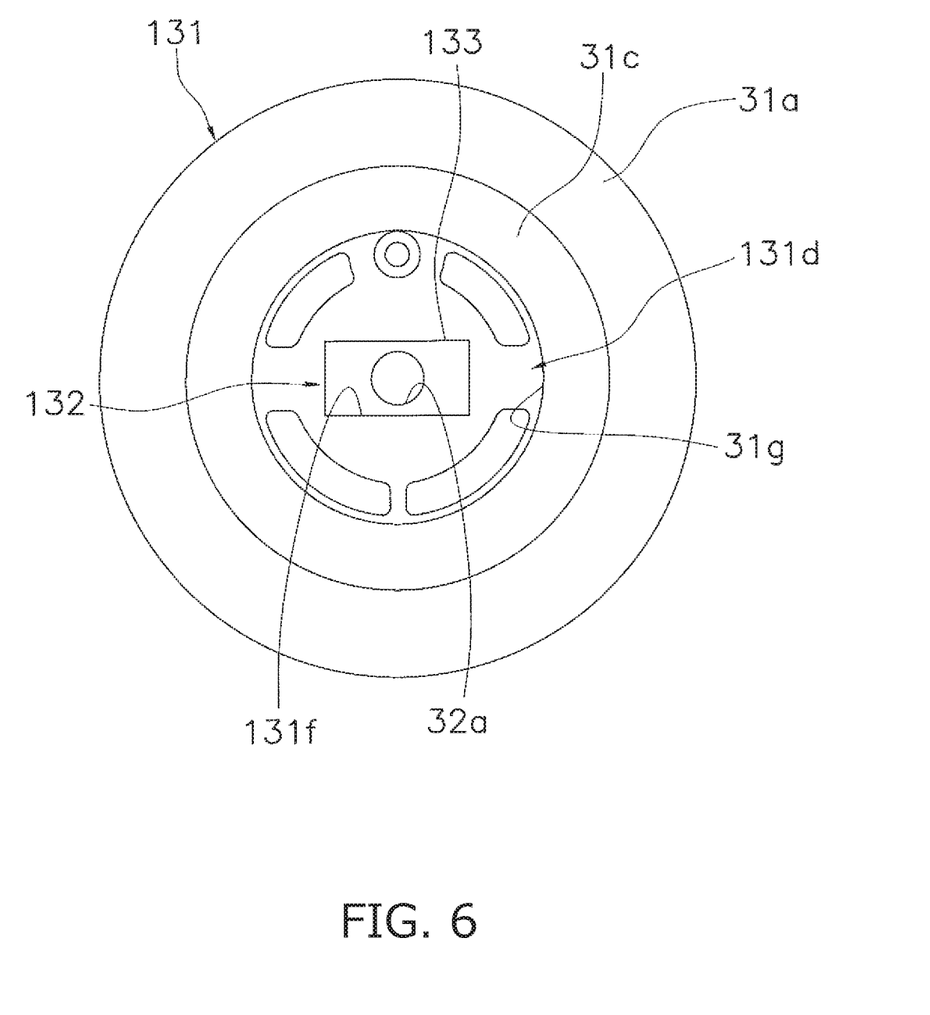
FIG. 6 is a view corresponding to FIG. 4 according to another embodiment.

In addition, as shown in FIG. 6, a screwable member 132 may have a rectangular shape that is long in the direction in which the knob portion 31b extends when viewed in the axial direction. In this embodiment, a rotation prevention member 133 is integral with the screwable member 32, and protrudes from the screwable member 32 only in the direction in which the knob portion 31b extends, along the outer diameter of the screwable member 32. In this embodiment, a small diameter portion 131f of an accommodating recess 131d of a knob body 131 is formed in a rectangular shape in the same manner as the screwable member 132, in order to accommodate the screwable member 132.

What is claimed is:

1. A drag knob screwed onto a front end of a spool shaft and for adjusting a drag force of a drag mechanism of a spinning reel, comprising:
    a knob body including a knob portion rotatable in a circumferential direction of the spool shaft, protruding forward in an axial direction of the spool shaft and extending in a radial direction of the spool shaft, and an accommodating recess having a rearward opening in the axial direction of the spool shaft;
    a screwable member disposed in the accommodating recess of the knob body and screwed onto the front end of the spool shaft; and
    a rotation prevention member configured to prevent the screwable member from rotating relative to the knob body, having a width narrower than a width of the knob portion and protruding from the screwable member in a same direction as an extending direction of the knob portion of the knob body.

2. The drag knob according to claim 1, wherein
    the rotation prevention member comprises a shaft member penetrating the screwable member in the radial direction of the spool shaft.

3. The drag knob according to claim 1, wherein
    an outer circumferential surface of the screwable member is cylindrical.

4. The drag knob according to claim 1, wherein the knob body has an engagement recess engaging the rotation prevention member.

5. The drag knob according to claim 1, wherein the rotation prevention member is integral with the screwable member.

\* \* \* \* \*